United States Patent
Corley

[19]

[11] Patent Number: 6,089,188
[45] Date of Patent: Jul. 18, 2000

[54] ANIMAL SPRAYING AND SCRATCHING PROPERTY PROTECTOR

[76] Inventor: Mary Elizabeth Corley, 428 Glenwood Ave., Teaneck, N.J. 07666

[21] Appl. No.: 09/299,873

[22] Filed: Apr. 26, 1999

[51] Int. Cl.⁷ .................................................... A01K 29/00
[52] U.S. Cl. ............................................ 119/161; 119/170
[58] Field of Search ..................... 119/161, 165, 119/169, 170; D6/610

[56] References Cited

U.S. PATENT DOCUMENTS

| | | | |
|---|---|---|---|
| 229,436 | 6/1880 | Mallett, Jr. ................... | 119/165 |
| 1,365,479 | 1/1921 | Gibbons ........................ | 119/61 |
| 2,306,014 | 12/1942 | Carson ........................ | 119/161 |
| 2,390,854 | 12/1945 | Thompson ..................... | 119/161 |
| 3,566,838 | 3/1971 | Edwards ....................... | 119/161 |
| 3,735,735 | 5/1973 | Noroian ........................ | 119/165 |
| 3,800,739 | 4/1974 | Anderson ...................... | 119/475 |
| 3,827,401 | 8/1974 | Franzel ........................ | 119/169 |
| 4,279,217 | 7/1981 | Behringer ...................... | 119/170 |
| 4,385,010 | 5/1983 | Bosne ........................... | 261/110 |
| 4,892,058 | 1/1990 | Clark ............................ | 119/161 |
| 4,912,888 | 4/1990 | Martin ........................... | 52/12 |
| 4,998,504 | 3/1991 | Ball ............................. | 119/169 |
| 5,080,046 | 1/1992 | Cassone ........................ | 119/169 |
| 5,134,974 | 8/1992 | Houser ......................... | 119/165 |
| 5,353,743 | 10/1994 | Walton ......................... | 119/165 |

*Primary Examiner*—Peter M. Poon
*Assistant Examiner*—Elizabeth Shaw
*Attorney, Agent, or Firm*—Cobrin & Gittes

[57] ABSTRACT

An animal spraying and scratching property protector that protects an area to be sprayed by blocking the urine from reaching the targeted area. The animal spraying and scratching property protector comprises a splashwall and trough. The splashwall is positioned erect to protect the areas that may be sprayed. The trough is arranged to collect the urine as the urine drips downward along the splashwall after the urine has been sprayed onto the splashwall by an animal such as a cat. The trough is closed at oppositely disposed sidewalls in order to prevent the urine from exiting or otherwise leaking from the sides of the trough. The area targeted for spraying is protected by blocking the urine, thereby, safeguarding the protected areas. The urine can be neatly disposed of, for example, by pouring the urine from the trough into a toilet. The animal spraying and scratching property protector can then be rinsed and replaced for the next spraying instance.

21 Claims, 4 Drawing Sheets

ANIMAL SPRAYING AND SCRATCHING PROPERTY PROTECTOR

BACKGROUND OF THE INVENTION

1. Field of the Invention

The present invention generally relates to animal spraying and scratching property protection devices.

2. Discussion of Related Art

Animal spraying is the behavior demonstrated when an animal targets an area in the environment in which it lives by urinating against a chosen area. Spraying, especially common with cats, has been explained as the manner in which a cat singles out an area as one to which it claims dominion. Spraying is presumably exhibited when a cat desires to mark its territory in order to assert territorial preference and/or control over a specific territory within the household in order to exclude other cats and animals from using the same area. The chosen areas may include portions of a wall, drapes, a favorite corner, or areas proximate to furniture such as couches, desks or appliances.

While cat spraying may occur in any household that has one or more cats, it is prevalent among multiple cat households. Cat spraying is also more prevalent among male cats than it is among female cats. Non-neutered cats are more likely to spray than are neutered cats. In multicat households, however, both neutered cats and female cats will spray.

Some pet owners detest cat spraying so much that they are no longer able to tolerate keeping the cat. For the owners who are able to tolerate cat spraying, the negative effects of cat spraying can be severe. Cat spraying may destroy furniture, and soil wall areas and other places where spraying has occurred. The cat urine odor is unpleasant and is particularly repulsive in male cats during puberty. Each of the above problems is further exacerbated if cat spraying occurs while the owner is not at home, and the urine sits on the contaminated area for a substantial period of time. This allows the urine to be absorbed into the contaminated areas, thereby causing substantial damage and a prolonged repulsive odor.

Many of the products and methods available on the market are primarily sanitary products that aid in the cleaning and sanitation of the sprayed areas. These products, usually solvents, aid in eliminating the urine stench and also assist in cleansing the sprayed areas. These areas, however, may still be damaged or even destroyed. In addition, many of the solvent-based products should not be used on furniture because the chemical solvent may damage the furniture, for example, by removing the finish. Of course, even in cases where solvents are usable, cleaning the contaminated areas is a time consuming task, and an undesirable undertaking to which there is a strong need for a more sanitary, less costly and quicker solution to the detrimental effects of cat spraying.

SUMMARY OF THE INVENTION

One aspect of the present invention resides in an animal spraying and scratching property protector comprising a splashwall and trough. The splashwall is positioned erect to protect the areas that may be sprayed. The trough is arranged to collect the urine as the urine drips downward along the splashwall after the urine has been sprayed onto the splashwall by an animal such as a cat.

For a better understanding of the present invention, reference is made to the following description and accompanying drawings, while the scope of the invention is set forth in the appended claims.

DESCRIPTION OF THE PREFERRED EMBODIMENT

The animal spraying and scratching property protector comprises a splashwall and a trough which protects the wall, corner area, furniture or appliance by serving as a substitute contact area for the urine and, in so doing, safeguards the protected areas. The urine can be neatly disposed of, for example, by pouring the urine from the trough into a toilet or may be wiped with a disinfectant and paper towel. The animal spraying and scratching property protector can then be rinsed and replaced for the next spraying instance. This manner of urine collection dispenses with the need to use solvents or rags to clean the soiled and contaminated areas.

The splashwall is preferably constructed from a rigid, non-porous, transparent material such as transparent plastic, acrylic or glass. The rigid material adds stability to the animal spraying and scratching property protector, while transparency gives the cat the illusion that it is spraying the protected area behind the animal spraying and scratching property protector. The cat, however, actually is spraying the animal spraying and scratching property protector. The non-porous material inhibits any seepage through the animal spraying and scratching property protector.

The animal spraying and scratching property protector may be collapsible, expandable, and/or retractable. A retractable spraying and scratching property protector may be comprised of a rigid frame housing a roller shade. The animal spraying and scratching property protector may have a liner, either disposable or reusable, removably placed in the trough portion to catch the urine, leaving the rest of the trough portion clean.

Figure 1:
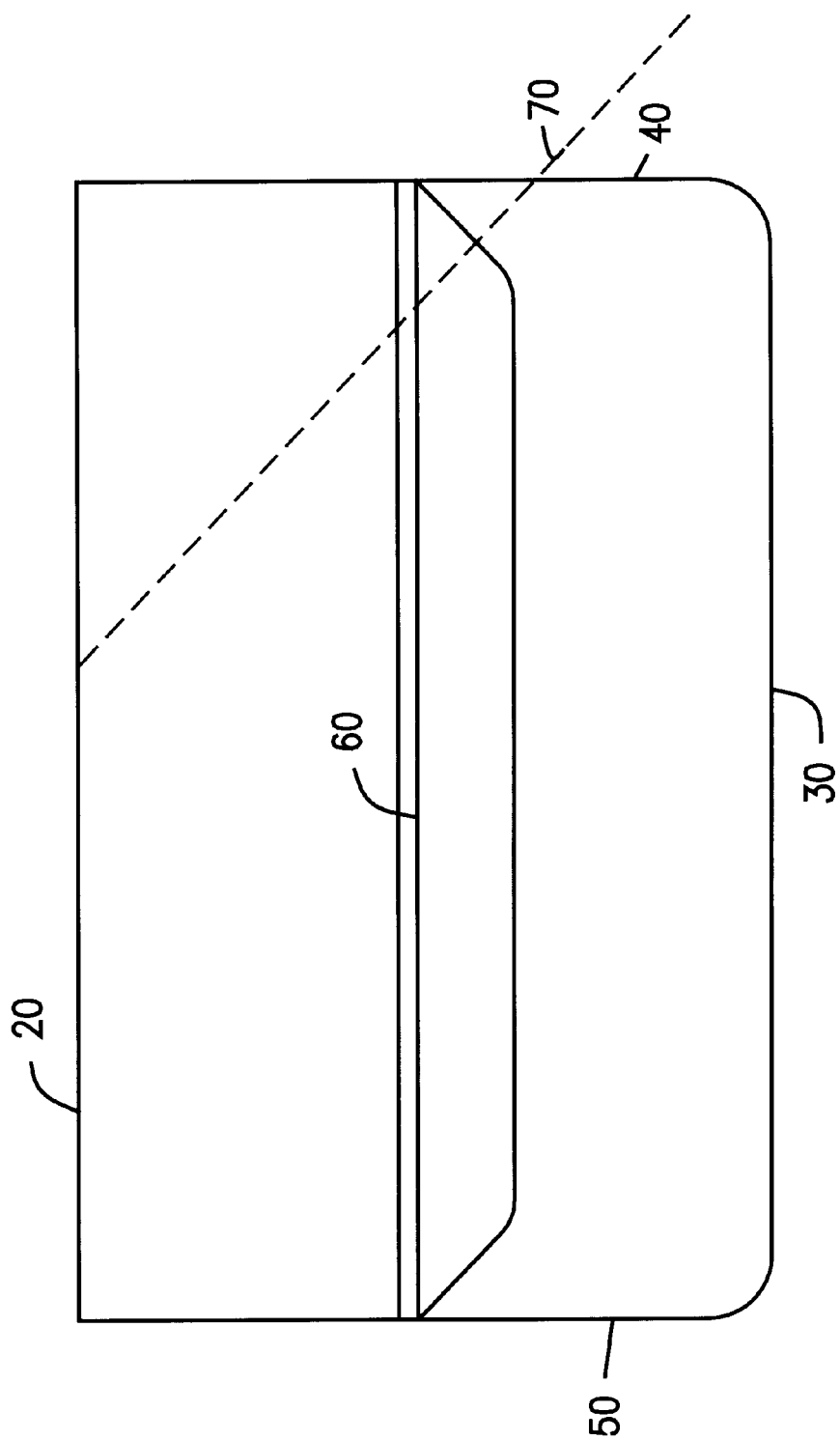
FIG. 1 is a perspective view of a first embodiment of the animal spraying and scratching property protector.

According to a first embodiment of FIG. 1, an animal spraying and scratching property protector 10 comprises a splashwall 20 that extends along a trough 30, which is arranged to catch urine as it drips downward from the splashwall 20 into the trough 30. The trough comprises at least two oppositely disposed sidewalls 40, 50. The splashwall 20 and trough 30 may be hingeably connected at the intersection 60 of the splashwall 20 and trough 30 to allow the splashwall to rotate behind or over the trough 30 for storage purposes.

The animal spraying and scratching property protector is affixed with a support 70 that is removably fixed to a side of the splashwall 20 that is opposite one side of the trough. This support 70 enables the animal spraying and scratching property protector to be self standing. The support 70 may be collapsible for easy storage and portability. Additionally, the support 70 may be retractable to facilitate use of the animal spraying and scratching property protector against different surfaces or upon different floors. Support 70 may be a pole angled to return the splashwall 70 in its open and erect position to prevent it from collapsing into its closed position over the trough 30.

In use, the animal spraying and scratching property protector is placed immediately in front of the area the cat owner believes is targeted to be sprayed. The cat sprays its urine toward the area, but the spray is blocked by the splashwall 20 instead. Thus, the spray never actually reaches the targeted area.

Figure 2:
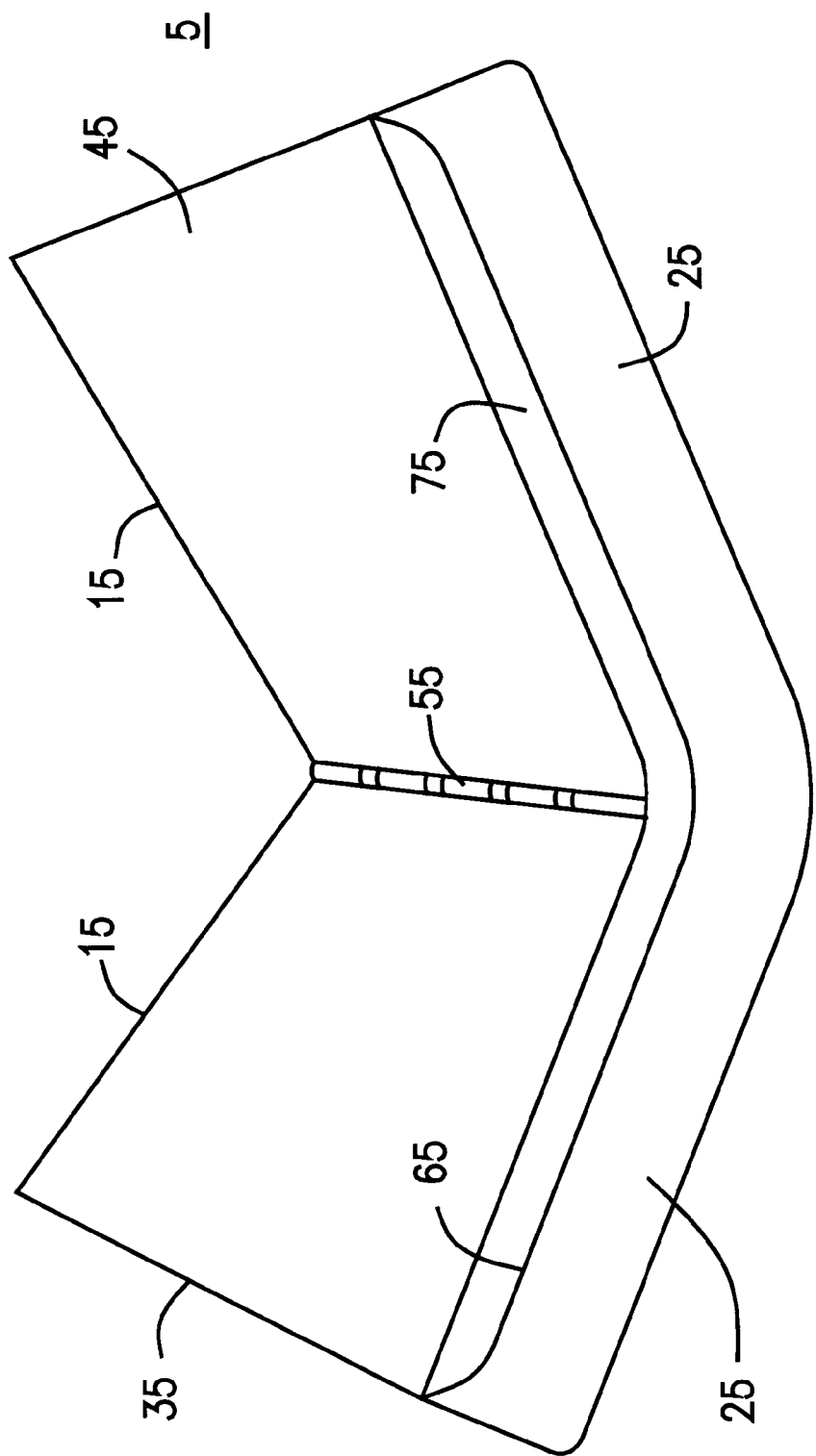
FIG. 2 is a perspective view of a second embodiment of the animal spraying and scratching property protector.

FIG. 2 shows a second embodiment of an animal spraying and scratching property protector 5 for angular placement, around walls, corners, appliances or the like. The embodiment of FIG. 2 comprises an angled splashwall 15 arranged to block, the urine from reaching the area beyond the splashwall. The angular splashwall 15 is comprised of a plurality of sides 35, 45 that are hingeably connected at their intersection 55. The trough 25, is also comprised of a plurality of sides 65, 75 with sealably closed oppositely disposed sidewalls. The hinge connections permit varying the angle of the animal spraying and scratching property protector to fit the angled area to be protected.

Figure 3:
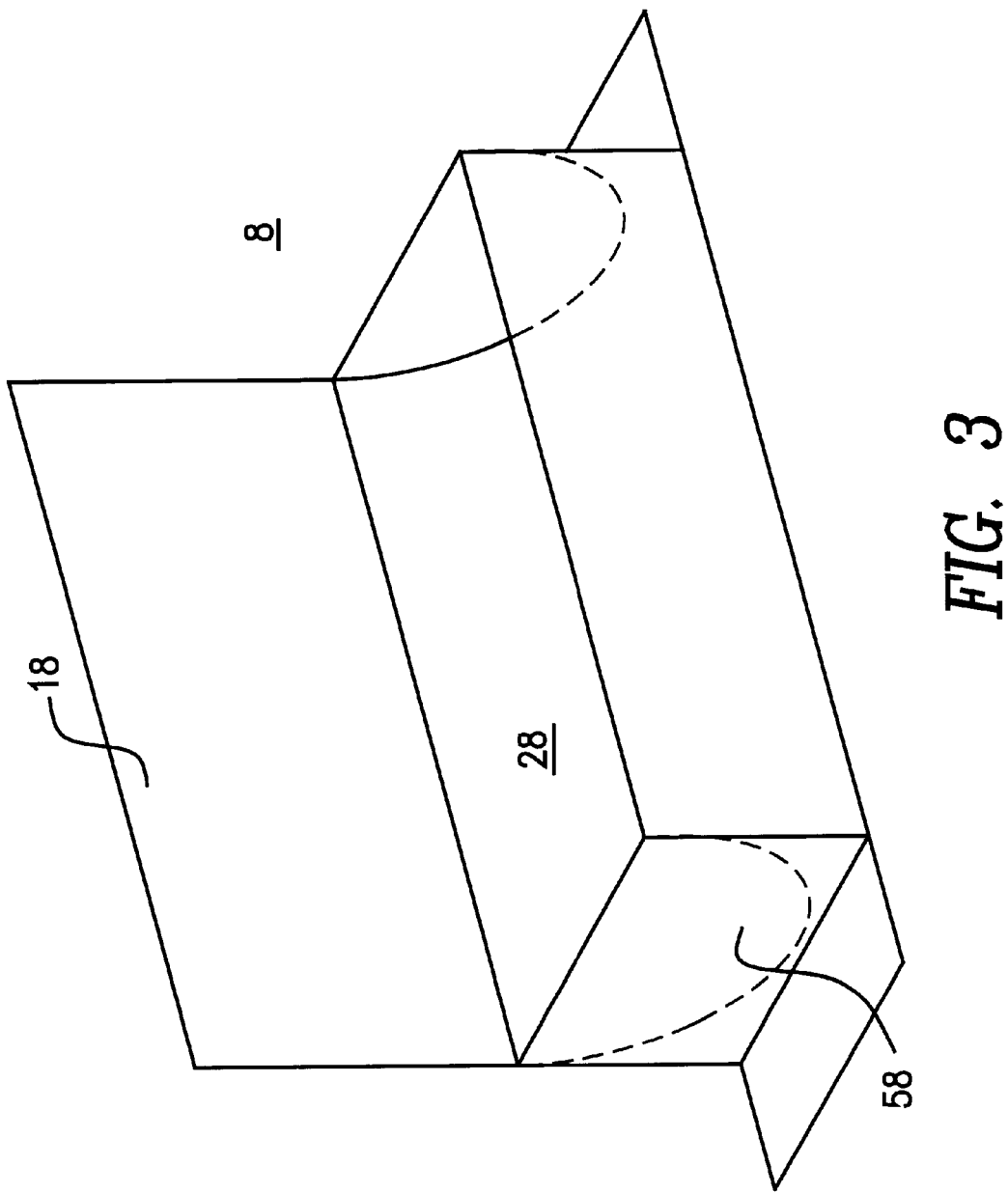
FIG. 3 is a perspective view of a third embodiment of the animal spraying and scratching property protector.

FIG. 3 shows a third embodiment of an animal spraying and scratching property protector 8 comprising a splashwall 18 which extends along an angled trough 28. The trough 28 is removably or permanently attached to a receptacle 58 that enables the animal spraying and scratching property protector to be free standing. This embodiment of the animal spraying and scratching property protector is preferred in instances wherein a backwall support would interfere with placement of the animal spraying and scratching property protector, such as, when a very close proximity or direct contact is required between the area targeted for spraying and the animal spraying and scratching property protector. Because this embodiment does not require a support affixed to the backwall splash 18, the animal spraying and scratching property protector may be placed directly in contact or very close to the targeted area. The splashwall 18 may even be slanted so as to ensure direct contact with the area to be protected. A removable trough also prevents cats from scratching walls, furniture and other exposed areas.

Figure 4:
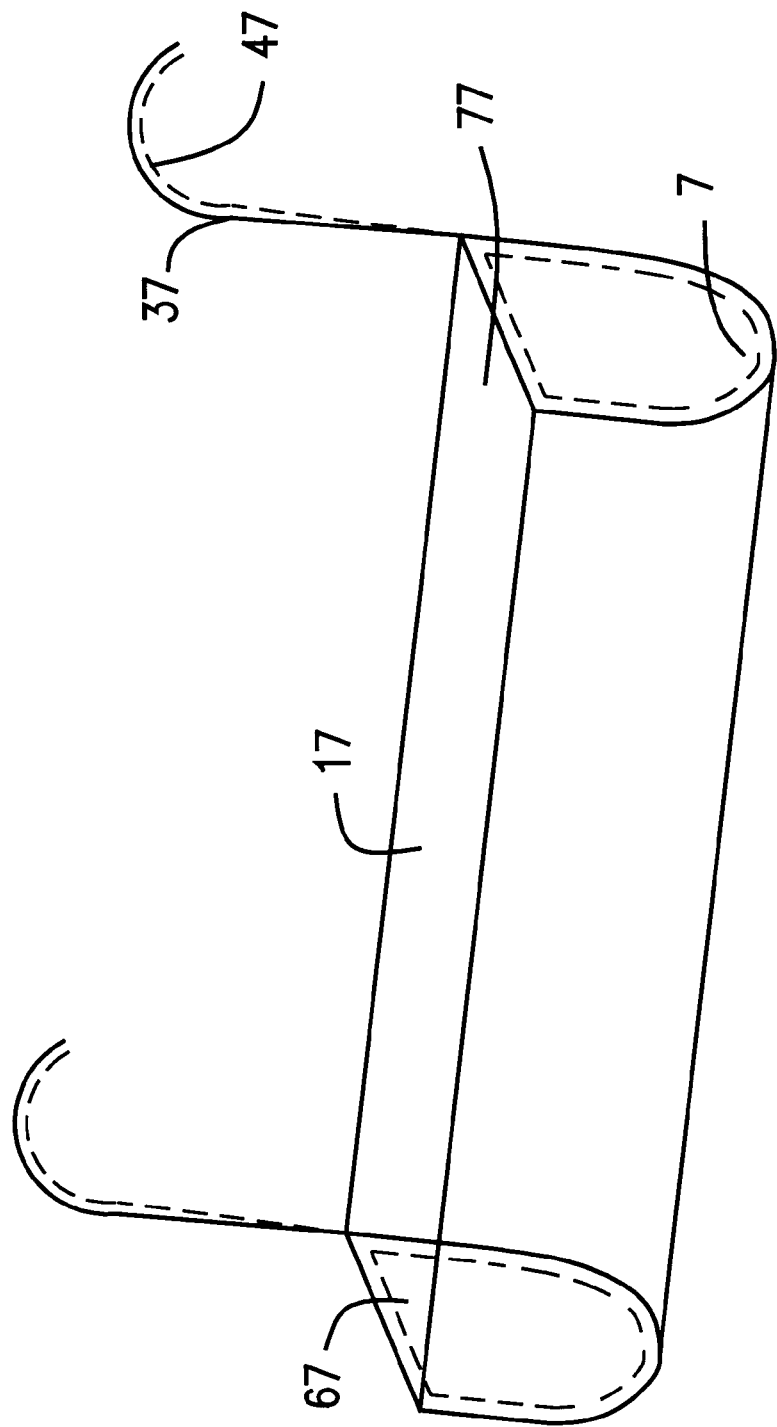
FIG. 4 is an elevation view of the animal spraying and scratching property protector with a removable liner.

FIG. 4 is an elevated view of the trough of the animal spraying and scratching property protector which contains a liner. The liner 7 is preferably a transparent, non-porous, disposable liner that is shaped in a manner corresponding to the trough 17 and splashwall 27. The splashwall comprises a front side 37 and a back side 47. The front side faces the trough 17 and the back side faces away from the trough 17. The liner overhangs the front side 37 of the splashwall onto the back side 47 as well as the oppositely disposed sides 67, 77 of the trough 17. The liner 7 has a self adhesive strip placed so that the liner may be sealed after spraying has occurred to secure the urine within the liner. The sealed liner containing the urine is then removed from the animal spraying and scratching property protector.

The liner 7 may also be equipped with a self contained pregnancy test, pH sensitive paper or other scientific gauge that can analyze urine for the presence, absence or amount of chemical substances for use in studies or in conjunction with the health care of the pet.

While the foregoing and drawings represent the preferred embodiments of the present invention, it will be understood that various changes and modifications may be made without departing from the spirit and scope of the present invention.

What is claimed is:

1. An animal spraying and scratching property protector comprising:
    a trough; an erect splashwall connected to the trough, the trough being configured with a curved surface arranged to collect urine as the urine drips downward from the splashwall from animal spraying.

2. An animal spraying and scratching property protector of claim 1 further comprising a support arranged to keep the splashwall erect.

3. An animal spraying and scratching property protector of claim 2 wherein said support is a telescopic pole.

4. An animal spraying and scratching property protector of claim 2 wherein said support is retractable.

5. An animal spraying and scratching property protector of claim 1 wherein said splashwall is transparent.

6. An animal spraying and scratching property protector of claim 1 wherein said splashwall is made of acrylic.

7. An animal spraying and scratching property protector of claim 1 wherein said splashwall is made of plastic.

8. An animal spraying and scratching property protector of claim 1 wherein said splashwall is made of glass.

9. An animal spraying and scratching property protector of claim 1 wherein said splashwall further comprises a rigid frame housing a roller shade.

10. An animal spraying and scratching property protector of claim 1 wherein said trough removable.

11. An animal spraying and scratching property protector of claim 1, wherein said splashwall and said trough are hinged together.

12. An animal spraying and scratching property protector of claim 1 wherein said splashwall and said trough are obliquely angled relative to each other.

13. An animal spraying and scratching property protector of claim 1 wherein said splashwall further comprises a plurality of sections each hinged to each other in succession one after another and said trough comprises a plurality of sections each hinged to each other in succession one after another.

14. An animal spraying and scratching property protector of claim 1 wherein said trough is attached to a receptacle that is arranged to render the splashwall and trough free standing.

15. A method of protecting property against spraying comprising the steps of:
    placing an animal spraying and scratching property protector configured with a curved trough between an area targeted for spraying and a location from which an animal may spray toward the area targeted so that said animal spraying and scratching property protector will be positioned between property to be protected from spraying and the animal that sprays;
    inserting a non-porous liner into said animal spraying and scratching property protector for receiving the urine; and
    sealing the liner after spraying in order to avoid spilling the urine.

16. The method of claim 15 further comprising adhering a self-adhesive strip to seal the liner closed after an animal sprays.

17. The method of claim 15 further comprising hanging a frontal side of the liner over an erect and transparent splashwall of said animal spraying and scratching property protector.

18. The method of claim 15 further comprising adhering the liner to said animal spraying and scratching property protector.

19. The method of claim 15 further comprising hanging oppositely disposed tabs of the liner over oppositely disposed sides of a trough of the animal spraying property protector.

20. The method of claim 15 further comprising the step of adhering a pH sensitive strip to the liner for testing the pH of the urine.

21. The method of claim 15 further comprising the step of adhering a chemically treated liner to the trough.

* * * * *